235-382 SR

12/27/83 XR 4,423,314

United States Patent [19]

Kato et al.

[11] 4,423,314

[45] Dec. 27, 1983

[54] TIME RECORDER

[75] Inventors: Hiroshi Kato, Atsugi; Masanori Numata, Yokohama, both of Japan

[73] Assignee: Amano Corporation, Yokohama, Japan

[21] Appl. No.: 263,078

[22] Filed: May 12, 1981

[30] Foreign Application Priority Data

May 12, 1980 [JP] Japan ........................ 55/62458

[51] Int. Cl.[3] ........................ G06K 1/00

[52] U.S. Cl. ........................ 235/377; 235/378; 235/382; 340/286 R

[58] Field of Search ........................ 346/47, 14, 80; 235/434, 487, 493, 467, 462, 382, 377, 378; 340/286 R

[56] References Cited

U.S. PATENT DOCUMENTS

| | | | |
|---|---|---|---|
| 3,805,026 | 4/1974 | Anders | 235/487 |
| 4,021,777 | 5/1977 | Shepard | 340/146.3 AH |
| 4,092,524 | 5/1978 | Moreno | 235/419 |
| 4,270,043 | 5/1981 | Baxter et al. | 235/419 |
| 4,283,769 | 8/1981 | Asada | 364/710 |
| 4,323,771 | 4/1982 | Chalker, Jr. et al. | 235/377 |
| 4,333,085 | 6/1982 | Witts | 346/76 PH |

OTHER PUBLICATIONS

E. Fabo & E. Höglund, "CTR-Computerized Time Recording", Ericsson Review No. 2, 1980.

*Primary Examiner*—G. Z. Rubinson
*Assistant Examiner*—Robert Lev
*Attorney, Agent, or Firm*—Cushman, Darby & Cushman

[57] ABSTRACT

A time recorder having an assembly with structure for reading out a personal code recorded on an inserted time card, a memory provided corresponding to each personal code for storing status data expressing at least the distinction of either "arrival queuing" or "departure queuing", a print column control for making reference to status storage corresponding to the personal code read out by a read-out at the time of receiving of the time card and also for printing the time of receiving of the time card in the arrival time column if the contents of the status storage are "arrival queuing" or in the departure time column if the contents are "departure queuing", and a storage status control for setting the contents of a status storage means to "departure queuing" every time when the printing is made in the departure time column.

10 Claims, 10 Drawing Figures

Control data for each work class

Personal file

TIME RECORDER

BACKGROUND OF THE INVENTION

This invention relates to a time recorder having functions to automatically discriminate and determine whether the time of receiving a time card is to be printed in either arrival time column or departure time column.

As well known, in conventional time recorders, a card pocket as a slot for inserting a time card is constructed in such a manner that the card pocket can be slid to different setting positions indicated as "arrival", "departure" and so forth (thereby, the position of the time card to be inserted in relation to the printer can be shifted in the width direction), and the time can be printed in the arrival time column of the card so long as the card pocket has been manually set to "arrival" position and the card has been inserted, and also in the departure time column of the card as long as the card pocket has been set to "departure" position and the card has been inserted when a worker corresponding to this time card is about to go home.

In addition, it is known that some conventional time recorders are able to automatically slide said card pocket to "arrival" position at a predetermined arrival time zone and to "departure" position at a predetermined departure time zone.

In case of time recorders of the former type in which the selection of either arrival or departure is manually performed, manual selection itself is somewhat troublesome and printing is frequently made in wrong columns because of incorrect selection. Particularly, when many persons assigned to work in different classes of working hours are using a common time recorder, and there are both workers who come to work and who are going home in the same time zone, almost every worker has to perform the arrival-departure selection in many cases, resulting in more chances of making errors during the selection.

Also, the time recorders capable of automatically performing the arrival-departure selection in response to the time zone cannot be used when some workers are going home while the others have just come to work in the same time zone.

SUMMARY OF THE INVENTION

The primary object of the present invention is to provide a time recorder capable of automatically printing the correct time of arrival and departure for each worker even if many workers are assigned to work in different classes of working hours.

It is another object of the present invention to provide a timer recorder capable of correctly printing the time of arrival on the time card even after a worker forgot to insert his time card into the time recorder at the time of previous departure.

Other and further objects of this invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE INVENTION

Figure 1:
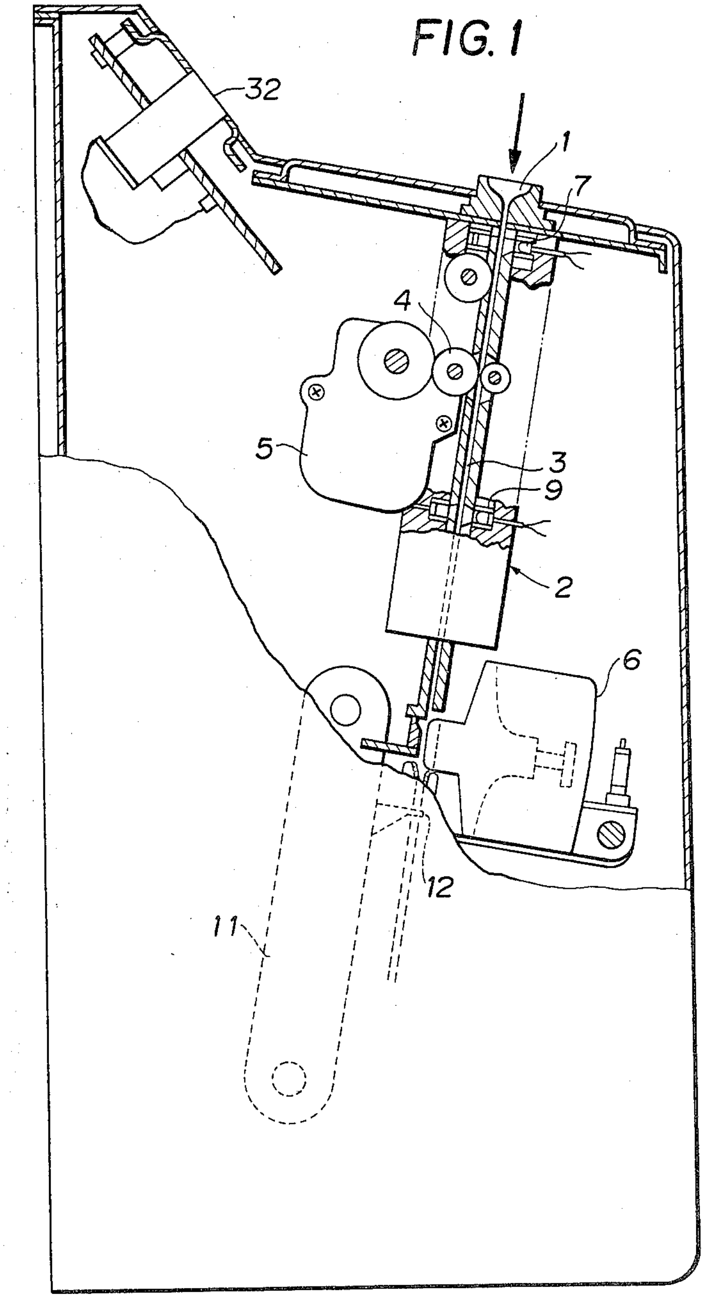
FIG. 1 is a partial selection showing the construction of a card insertion assembly and printer assembly of the time recorder, embodying the invention.
Figure 2:
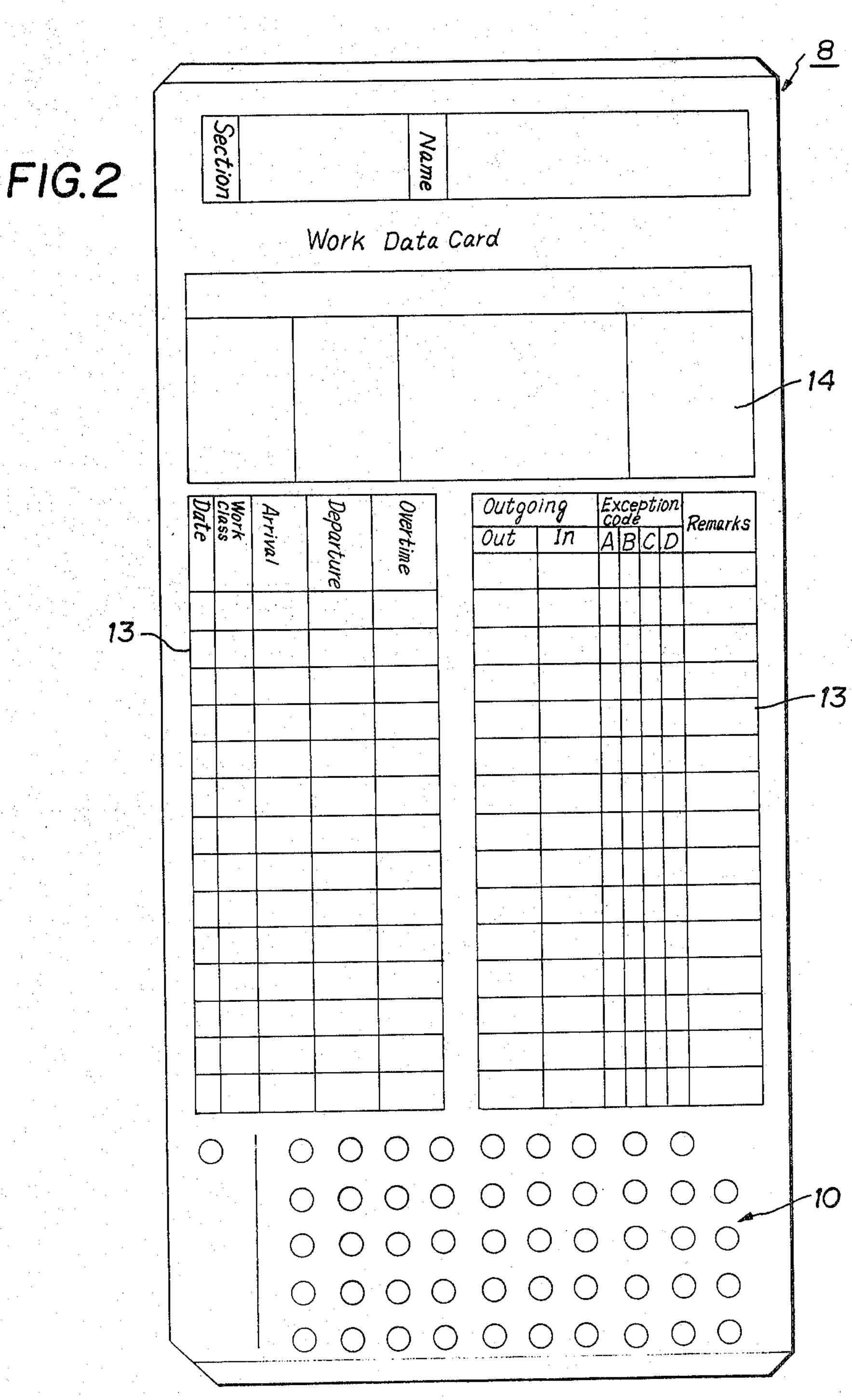
FIG. 2 is a view of the time card to be used for the time recorder of the present invention.

FIG. 1 shows the construction of the card insertion assembly and printer assembly of the time recorder of the present invention. Referring to FIG. 1, a card pocket 1, a card guide 2 having a guide slot 3 continuing to the card pocket 1, a card feed roller 4 driven by a card feed motor 5, and a wire impact type dot printer 6 are indicated. Also, a card detector 7 consisting of a set of light-illuminating and sensing elements oppositely located to each other at the both sides of the guide slot 3 in the upper portion of the card guide will produce a card detection signal when a time card 8 shown in FIG. 2 is inserted from the card pocket 1 and the light in the gap between the light-illuminatiing and sensing elements is blocked. A code reader 9 for reading out the personal code recorded in the form of punched hole on a punch code zone 10 at the bottom of card 8 will consist of plural sets of pairs of light-illuminating and sensing elements located oppositely at both sides of the guide slot 3. A card line position detector 11 for detecting the location of the card 8 with respect to the printer 6 and for determining the location of the print line of the card 8 will comprise a movable piece 12 capable of moving up and down if it contacts the bottom of said card 8 introduced into the guide slot 3 by the card feed motor 5, and a mechanism for detecting the amount of drop of the movable piece 12 from the original point.

As indicated in FIG. 2, a work data printing zone 13 is located and shown in the central portion of the time card 8. This printing zone 13 is divided into many rows by horizontal dividing lines, and each row (or line) is also divided by the vertical dividing lines into the following columns:

| | |
|---|---|
| "Date" | Date print column for printing the date of processing of the time of arrival. |
| "Class" | Work class print column for printing a figure indicating corresponding work class. |
| "Arrival" | Print column for printing the time of arrival. |
| "Departure" | Print column for printing the time of departure. |
| "Overtime" | Print column for printing the hours of overtime work to be handled as early attendance and prolonged attendance to work. |
| "Outgoing, out" | Column for printing the time of going out of a worker during hours. |
| "Outgoing, in" | Column for printing the time when a worker returned from his temporary absence during working hours. |
| "Ex. code" | Exception code print column for indicating various kinds of contents handled such as "coming late", "leaving earlier", "early attendance to work", and "prolonged attendance to work". |
| "Remarks" | Column for printing other data. |

In the code zone 14 of the time card 8, said exception codes and corresponding meaning of codes will be printed in advance.

Also, in punch card zone 10 of the time card 8, both personal code assigned to each card owner and work class code for this card owner are recorded in the form of punched holes in accordance with the predetermined format.

Now, the work classes will be described below in detail. According to this time recorder, plural work classes can be handled, and each work class has its own predetermined working hour system different from those for other classes. The basic items of the working hour system are the time of start of work and the time of end work; for example, start of work at 8:00 and end of work at 16:00 can be used for work class (1); start of work at 6:00 and end of work at 12:00 for work class (2); and start of work at 12:00 and end of work at 20:00 for work class (3). In addition to the time of start and the time of end of work, time zones for early attendance and prolonged attendance to work to be handled as overtime work, and also the nonworking days are predetermined for each work class.

Figure 4:
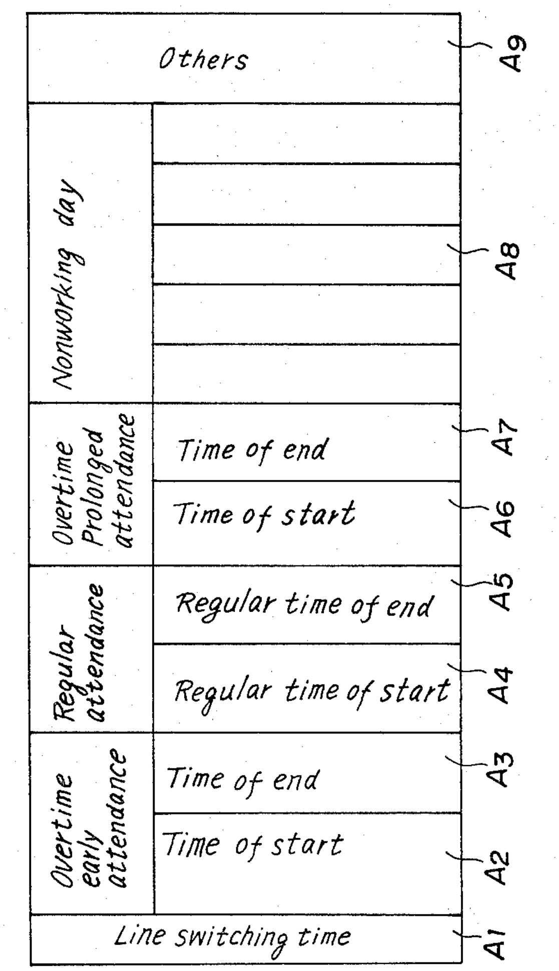
FIG. 4 is a diagram showing the control data to be stored in a control data memory as shown in FIG. 3.

In this time recorder, the control data based on the working hour system of each work class are stored in the predetermined memory described later. The configuration of these control data in the memory is shown in FIG. 4. These control data in FIG. 4 are used for a single work class, for which the time of start of work is stored in areas A4 and A5, the early attendance time zone is reserved in areas A2 and A3, the prolonged attendance time zone in areas A6 and A7, nonworking days in area A8, and other set data such as time of recess in area A9. In area A1, the line switching time (described later in detail) for updating the print line of time card and the processing date is set, and an intermediate time of day between the time of end of work and the time of start in the following day is generally selected. Thus, these control data are established for each work class, and the work data of each person are processed basing upon these control data. As an example of such processing, the time recorder will determine an input of arrival time is before or after the time of start of corresponding work class, whether the arrival is normal or delayed, and whether an input of departure time is before or after the time of end of work to judge if the departure is normal or leaving earlier.

Also, in this time recorder, predetermined work data are printed in the printing zone 13 of time card 8, work data for each person are stored in the memory of the equipment, and arithmetic operation and storing of results of operation are also performed.

Figure 5:
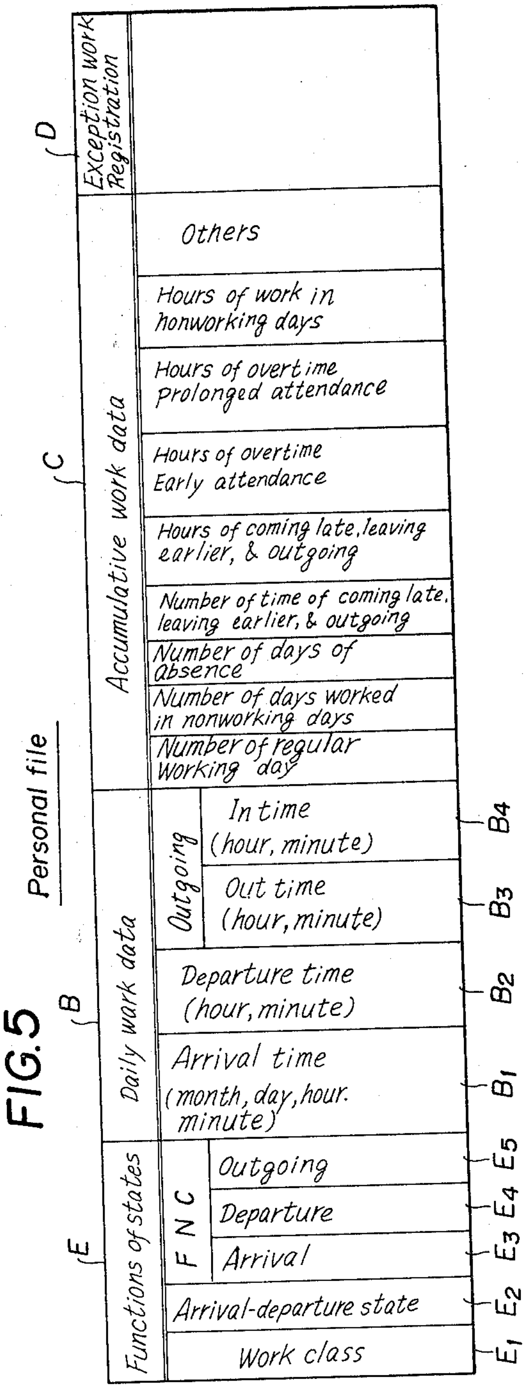
FIG. 5 is a diagram showing the configuration of a personal file to be stored in a file memory 24 as shown in FIG. 3.

FIG. 5 shows the configuration of the personal file for storing various kinds of data each person. As shown in detail in this Figure, the personal file areas B's are the zones for temporarily storing the latest daily work data and, in particular, the time of arrival is stored in B1, the time of departure in B2, the time of outgoing (out) in B3, and the time of outgoing (in) in B4. Areas C's store the work data after the arithmetic operation in which work data such as the number of days worked, the number of days of absence, the overtime hours of early attendance, and the overtime hours of prolonged attendance. Though this time recorder stores the time of arrival and departure in its memory and sums and stores the work data for each item basing upon the stored contents, they will not be described in detail since not directly related to the present invention. Also, areas D's for personal files are used for registering the items related to exception work such as overtime early attendance and prolonged if they are required (these are also not directly related to the present invention).

Also, areas E's for personal files are used for storing various kinds of state and function codes expressing the status of processing the exception work such as overtime early attendance and prolonged attendance as well as for discrimination the arrival and departure. Area E1 stores the work codes read out from the time card 8, which will be called "work class register" hereinafter. Also, area E2 stores either one of four state codes of "arrival queuing", "departure queuing", "outgoing, out", and "outgoing, in", which will be called "arrival-departure state register" hereinafter.

Figure 3:
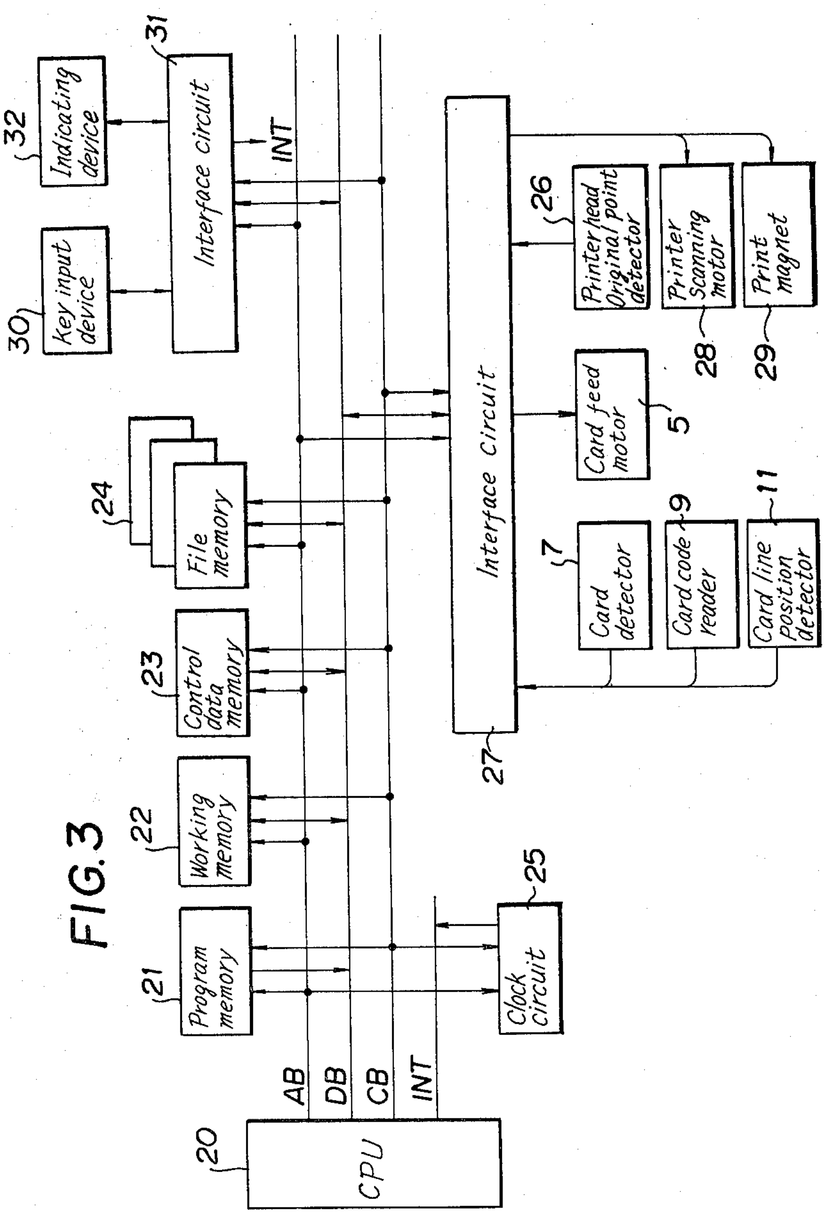
FIG. 3 is a block diagram showing the electrical configuration of the time recorder of the present invention.

Now, the electrical configuration of the time recorder of this invention will be described hereinafter by referring to the block diagram of FIG. 3. This time recorder mainly consists of a so-called microcomputer including a cetral processing unit 20 (this is a so-called microcomputer and abbreviated as CPU 20 hereinafter), its address bus AB, data bus DB, control bus CB, and interruption signal line INT.

Four different kinds of memories of a program memory 21, a working memory 22, a control data memory 23, and a file memory 24 are connected to the CPU 20. The program memory 21 is used exclusively for read-out and stores the system program prescribing the operation of CPU 20. The working memory 22 functions as a memory for both read and write (RAM), and is used as a temporary storage area for various kinds of data needed for the operation of CPU 20. The control data memory 23 is also a RAM, and stores the control data for each work class shown in FIG. 4. The file memory 24 is also a RAM, and stores the personal file for each person indicated in FIG. 5.

A clock circuit 25 comprises an oscillator for generating the reference signal for time processing, a counter and so forth, applies the pulse signal with 1-minute period (this is the called "1-minute pulse") as an interruption signal to the CPU 20, stores the period of time of service interruption of its main power source, and is capable of reading the period of time of this service interruption by means of CPU 20 after the recovery from the power failure.

Each signal detected at a detector 26 for detecting the return to the original point of said card detector 7, card code reader 9, card line position detector 11, and the head of printer 6 can be read out by the CPU 20 through an inter-face circuit 27. Also, said card feed motor 5, a motor 28 for scanning the head of the printer 6 in the direction of width of time card 8, and a print magnet 29 for driving the dot wires of the printer 6 are all controlled through the interface circuit 27 by the CPU 20.

Also, a proper key input device 30 is connected through an interface circuit 31 to the CPU 20. And by using this key input device 30, it is possible to switch the operation modes of CPU 20 and to apply certain data to the CPU 20, such as setting desired data in the control data memory 23, registering the exception work such as outgoing and overtime work, and printing out the summed data of the file memory 24. In addition, an indicating device 32 connected through the interface circuit 31 to the CPU 20 includes the segment indicators capable of indicating the time (month, day, hour and minute) and lamps for indicating other operation modes.

Now, basing upon the flowcharts shown in FIGS. 7 to 9, the operation of the time recorder of the present invention will be described in detail hereinafter. These flowcharts express part of configuration of the system program stored in the memory 21 for prescribing the operation of CPU 20.

Figure 6:
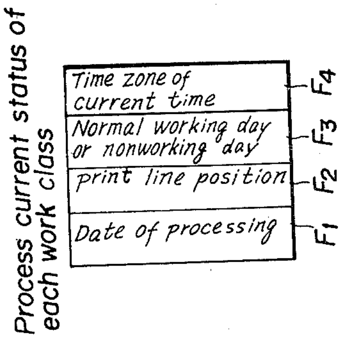
FIG. 6 is a diagram showing the configuration of process current status data created in working memory 22 as shown in FIG. 3.
Figure 8:
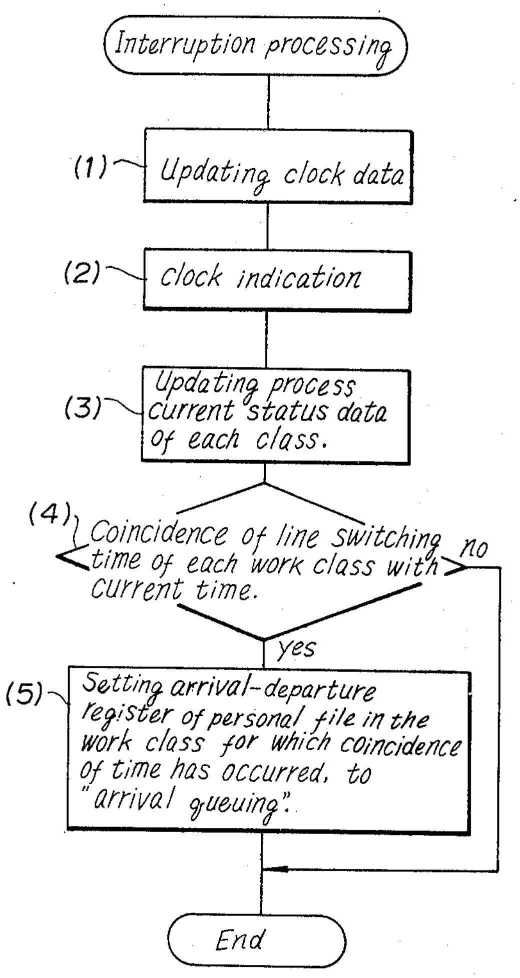
FIG. 8 is a flowchart showing the processing procedure of an interruption processing routine capable of responding to 1-minute pulses of CPU 20.

When 1-minute pulses from the clock circuit 25 are applied to the CPU 20, the interruption processing shown in FIG. 8 is executed. During first routine (1) of this interruption processing, the clock data are updated. That is, data of month, day, hour and minute of the clock register set in the working memory 22 are updated only for one minute. In subsequent routine (2), the updated data in said clock register are supplied to and indicated on the indicating device 32. In the subsequent routine (3), the current time data (month, day, hour and minute) of said clock register and control data for each work class in the control data memory 23 are compared to each other, and the contents of the process current status data register set for each work class in the working memory 22 are updated. The configuration (items) of these process current status data is shown in FIG. 6. "Process date" of F1 shown in FIG. 6 is an area for storing the date to be printed in "date" column (also used for internal data processing) when the time card 8 belonging to the corresponding work class at the current time is inserted, and the data F1 of this "process data" are updated when the line switching time of area A1 in the control data coincides with the current time. "Print line position" of F2 is an area for storing the line number to be printed when the time card 8 belonging to the corresponding work class is inserted at the current time and, as above, "1" is added to data F2 of this "print line position" when the line switching time coincides with the current time. In F3 of "nonworking or normal working day", the data F3 expressing whether the process date data F1 as control data is a nonworking day or not will be stored. In F4 of "time zone in current time", the data F4 expressing whether the current time corresponds to any one of early attendance time zone, normal time zone and prolonged attendance time zone will be stored.

In the subsequent routine (4), in the same manner as stated in routine (3), whether the current time in said clock register coincides with the line switching time in the control data for each work class is determined. If no coincidence occurs, this interruption process is terminated, but the operation will progress to the next routine (5) if the current time coincides with the line switching time of a certain work class. In the routine (5), if the work class which indicated the coincidence stated above is expressed by (A), said work class register E1 in all personal files of file memory 24 is checked, a personal file having this status (A) is sought out, and then "arrival queuing" code is set to said arrival-depryture register E2 of the personal file having the status (A). Then, the interruption process is completed, and the operation will return to the normal processing routine of FIG. 7.

Figure 7:
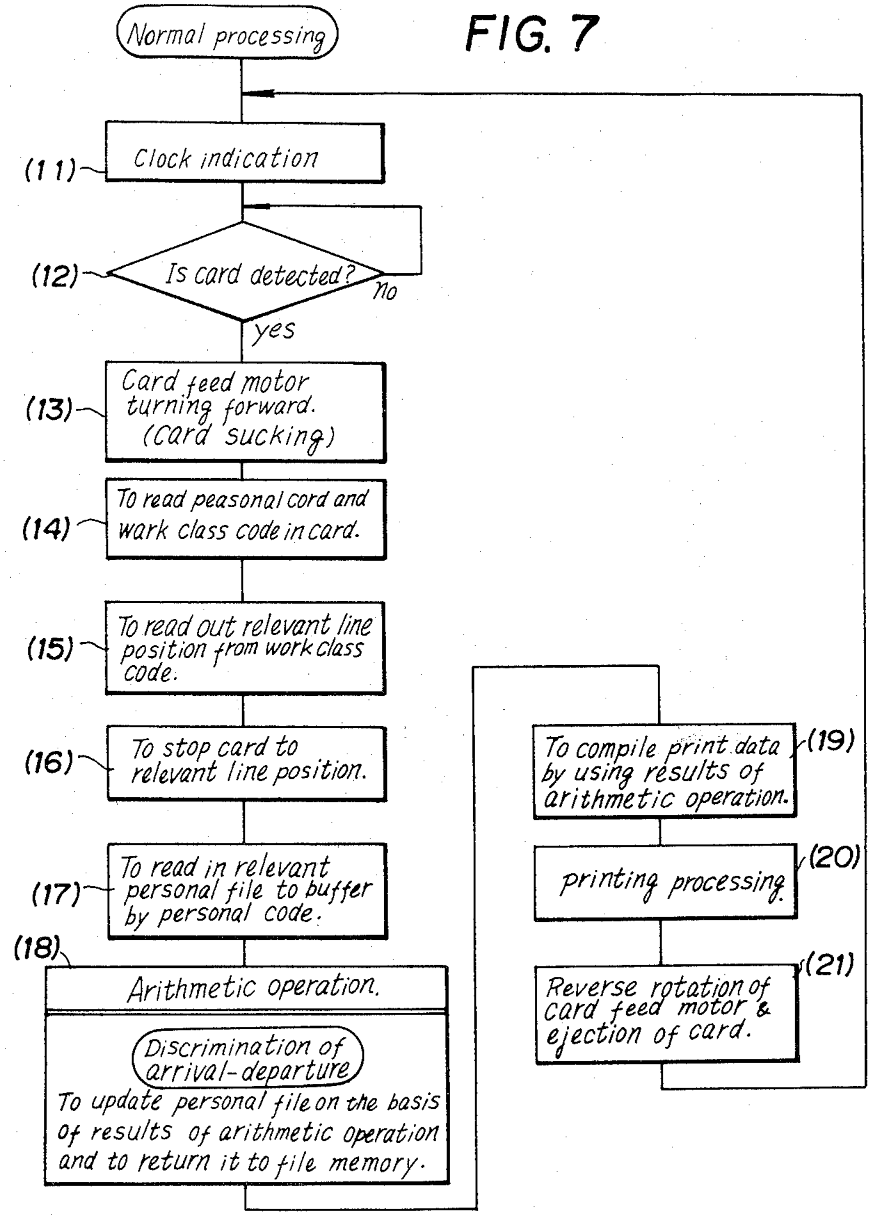
FIG. 7 is a flowchart showing the processing procedure of an ordinary processing routine during the operation of CPU 20 prescribed by a program in a program memory 21 as shown in FIG. 3.

In the routine (11) as a first routine of normal processing shown in FIG. 7, the current time data of said clock register are supplied to and indicated on the indicating device 32. In the subsequent routine (12), the output of said card detector 7 is checked, and whether the time card 8 is inserted to the card pocket is determined. This routine (12) is repeated until the insertion of the time card 8 is detected. And when the insertion of the card 8 is detected, the operation progresses to the routine (13) and the card feed motor 5 is started forward. Then the time card 8 inserted to the card pocket 1 is sucked into the guide slot 3 by means of the feed roller 4. In the subsequent routine (14), the output from said card code reader 9 is taken, the card is sucked into the guide slot 3, and then the personal code and work class code are read out from the punch code zone 10 of the card 8 passing through the location of the reader 9.

In the subsequent routine (15), the print line position data F2 are read out from said process current data (FIG. 6) of the corresponding with the work class code read out from the time card 8. In the subsequent routine (16), the output from the card line position detector 11 is checked, the print line position of the time card 8 being pulled inwardly to the guide slot 3 by the feed motor 5 is detected sequentially, and then the card feed motor 5 is stopped when the current print line position coincides with the print line position data F2 read out previously. Then, the time card 8 is set, with respect to the printer 6, to a line position corresponding to the print line position data F2 of corresponding work class, and stops.

In the subsequent routine (17), the personal file (FIG. 5) corresponding to the personal code read out from the time card 8 during routine (14) is transferred to the working memory 22.

In the subsequent routine (18), basing upon the personal file transferred to the working memory 22, the process current status data F1 to F4 of the corresponding work class, and the current time data of clock register (the time of acceptance of time card), various kinds of arithmetic operations to obtain the required work data are performed, data of predetermined items in the personal file are rewritten using the results of these arithmetic operations, and then these data are returned to the file memory 24. Within the arithmetic operation routine (18), the arrival-departure discrimination routine of the present invention is included, by which the particular time corresponding to the time of acceptance of the card is selected out of the arrival time, departure time, outgoing-out time and outgoing-in time. Also, when the time of acceptance of the card is equal to the arrival time, the time zone data F4 of the current time are checked to determine whether the time corresponds to normal arrival or coming late, and the arrival time is checked to determine whether it is in the time zone of early attendance or not and the process for early attendance is performed if necessary where the early attendance has been set in the personal file. Also, nonworking and normal working day data F3 are checked to determine whether the current time relates to ordinary working day or nonworking day. In addition, the data of each item of the personal file are arithmetically processed.

In the subsequent routine (19), the print data to be printed in the printing zone 13 of the time card 8 in conformity with the results of arithmetic operation stated above are compiled in the working memory 22. For instance, if the time of corresponding of the card is recognized to be a normal arrival by said arithmetic operation routine (18), the process date data F1 of the corresponding work class are set as print data corresponding to the date print column of the printing zone 13 of card 8, the work class code read out from the time card 8 is set as print data corresponding to the print zone of the work class, the time of acceptance of the card is set as print data corresponding to the arrival time print column, but data corresponding to the other print column are not set (data are left blank). Also, when the time of acceptance of a card is recognized to be the normal departure, the time of acceptance of the card is set as print data corresponding to the departure time print column, but other data will not be set. In addition, if coming late or early attendance is recognized with respect to the arrival time, a code expressing either coming late or early attendance is additionally set as print data corresponding to the exception code print column. Also, if leaving earlier or prolonged attendance of overtime is recognized at the time of departure, a code expressing leaving earlier or prolonged attendance is additionally set as print data corresponding to the exception code print column and, in case of prolonged attendance or early attendance of overtime, the corresponding time data will be set as print data corresponding to the print column for overtime work. Also, if the outgoing-out is recognized, both the time of acceptance of card and the outgoing code are set as print data corresponding to the outgoing-out time print column and the exception code print column. Also, if the outgoing-in is recognized, the time of acceptance of the card is set as print data corresponding to the outgoing-in time print column.

In the subsequent routine (20), the print data compiled in routine (19) are printed by the printer 6 on the predetermined line position of time card 8 which was already set in routine (16). That is, while the printer head is being moved in the width direction of card 8 by driving the printer scanning motor 28, the print magnet is sequentially driven in accordance with the print data and then relevant data are printed in the predetermined print column in the printing zone 13. Upon completion of printing, the operation progresses to routine (21), the card feed motor 5 is turned reversely to eject the time card 8 from the card pocket 1, and the operation returns to routine (11).

Now, the detail of the process of discrimination of arrival-departure in said arithmetic operation routine (18) will be described hereinafter.

In the process of discrimination of arrival-departure, the contents of arrival-departure state register E2 in the personal file (FIG. 5) corresponding to the inserted time card 8 which have been read into the working memory 22 during said routine (17) will be checked by routines (30), (31), (32) and (33) to determine which of the "arrival queuing", "departure queuing", "outgoing-out", and "outgoing-in" will be in the register E2.

If the arrival-departure state register E2 is found to have the contents of "arrival queuing", the operation progresses from routine (30) to routine (34), and the time of acceptance of the card is checked to determine whether it is within the allowable arrival time zone for the relevant work class (for instance, a span of time from the line switching time to the time or end of work is used as the allowable time zone). If it is within the allowable arrival time zone, the operation progresses to routine (38), and the time of acceptance of card is recognized as the time arrival. In the subsequent routine (42), the code of "departure queuing" will be set in said arrival-departure state register E2. This will complete the process of discrimination of arrival-departure.

If the arrival-departure state register E2 is found to be "arrival queuing", the operation progresses from routine (31) to routine (35), and the time of acceptance of the card is checked to determine whether it is within the allowable departure time zone of relevant work class (for instance, a span of time from the time of start of work to the line switching time is used as the allowable departure time zone). If it is within the allowable departure time zone, the operation progresses to routine (39), and the time of acceptance of the card is recognized as the departure time. In the subsequent routine (43), the "arrival queuing" code is set in said arrival-departure state register E2. This will complete the process of the discrimination of arrival-departure.

As clearly understandable from the above description, the first insertion of time card 8 from the line switching time to the time of end of work for the relevant work class is automatically recognized as "arrival" for work, and the time of acceptance of the card is printed in the arrival time print column. The second insertion of time card 8 from the time of start of work to the line switching time is automatically recognized as "departure" from work, and the time of accepatance of card is printed in the departure time print column. This Process of discrimination of arrival-departure is performed basing upon the arrival-departure state register E2 set for each person, and this state register E2 is set to "departure queuing" during arrival and to "arrival queuing" during departure, so that manual input operation is absolutely not necessary for the discrimination of arrival-departure. In addition, since the arrival-departure state register E2 is provided for each person, the discrimination of arrival-departure for each person can be always made correctly even though many time cards for persons with the same work class or different work classes are inserted one by one during the same time zone. Also, if some person has forgotten to insert his time card to the time recorder at the time of his departure from the work, the line switching time of the relevant work class will come while the arrival-departure state register E2 of his personal file is in the state "departure queuing". Then, this arrival-departure state register E2 is forcibly set to "arrival queuing" by excution of routines (4) and (5) of the interruption processing shown in FIG. 8. Therefore, if the same time card is inserted at the time of his arrival in next day, the time of acceptance of this card is recognized as arrival time for his work to as to prevent any trouble in data processing. The time of departure which was not printed because of forgotten insertion of card by him may be automatically processed using the time of end of work as the time of departure.

Now, the process related to the outgoing will be described below. For the ordinary working state described hereinbefore, the arrival-departure state register E2 is switched only to "arrival queuing" and "departure queuing" and no any processing is performed for the outgoing, so that the outgoing is processed as exception work which required registration in advance for the outgoing. That is, if a worker is about to go out during working hours, he must perform a manual input operation for outgoing by using the key input device 30 and then insert his time card 8 to the time recorder. Then, a personal file corresponding to this time card is read into the working memory 22, "outgoing-out" is set in the corresponding arrival-departure state register E2, and then the process of discrimination of arrival-departure shown in FIG. 9 is excuted.

Then, the decision of each operation will become NO for routine (30), NO for routine (31), and YES for routine (32) respectively, the operation progresses to routine (36), and then the time of acceptance of the card is checked to determine whether the time is within the allowable outgoing time zone of the relevant work class (for example, regular working hours may be used for this time zone). If it is within the allowable time zone, routine (40) will begin and the time acceptance of the time card is recognized as outgoing-out time. In the subsequent routine (44), "outgoing-in" is set in said arrival-departure state register E2. This will complete the process of discrimination of arrival-departure.

When the person who went out previously has come back and inserted his time card, the decision of NO will be made at routine (30), NO at routine (31), NO at routine (32) and YES at routine (33) respectively during execution of discrimination of arrival-departure, then the operation progresses to routine (37) to determine whether the time of acceptance of time card of relevant work class is within the allowable outgoing time zone. If it is found to be the allowable time zone, the routine (41) will start and the time of acceptance of card is recognized to be outgoing-in time. In the subsequent routine (45), "departure queuing" is set in the arrival-departure state register E2. This will complete the process of discrimination of the arrival-departure.

If the decision of NO is made in said routine (33), (34), (35), (36) and (37), the error process of routine (46) starts, the card feed motor 5 is turned reverse to eject the card 8 and, at the same time, a predetermined alarm is energized to inform the owner of card of the abnormal state.

Another embodiment of the present invention will be described hereinafter. As already described in the interruption processing of FIG. 8, if the arrival-departure state register E2 of all personal files belonging to the work class can be initially set to "arrival queuing" when the line switching time of each work class has come by means of routine (4) and (5), no problem will occur even if the state codes other than the four kinds described above are set in the arrival-departure register E2 during routine (39) of the process of discrimination of arrival-departure shown in FIG. 9.

Also, in the embodiment stated above, an abnormal state in which the line switching time may elapse while the arrival-departure state register E2 is not in the state of "arrival queuing" can be detected and, at that time, the arrival-departure state register E2 can be set to "arrival queuing" by means of routine (4) and (5). However, this invention is not limited to such operation stated above, and same function can be also achieved by the processing described below.

Figure 9:
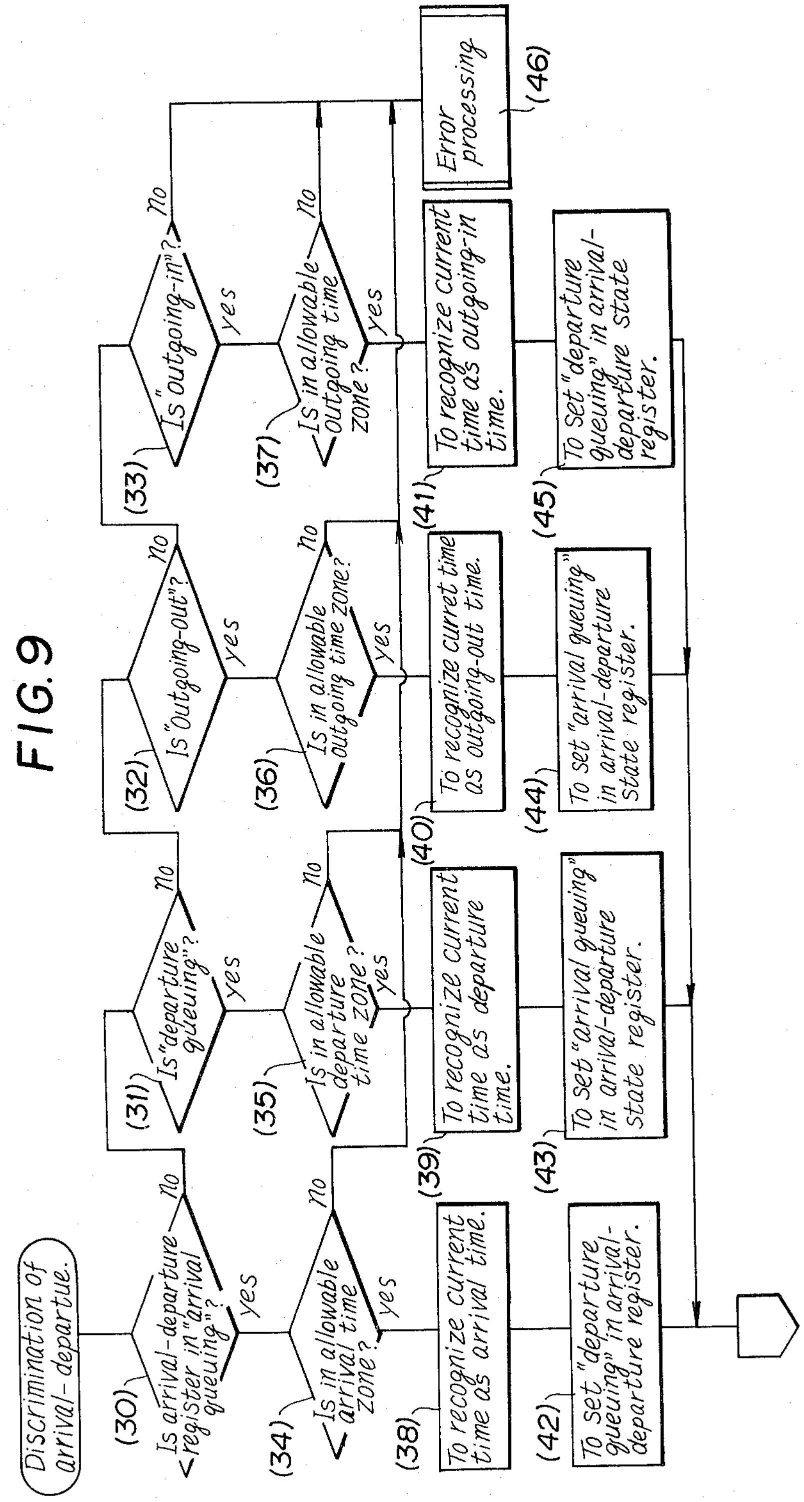
FIG. 9 is a flowchart showing a procedure of the arrival-departure discrimination process included in arithmetic processing routine as shown in FIG. 7.
Figure 10:
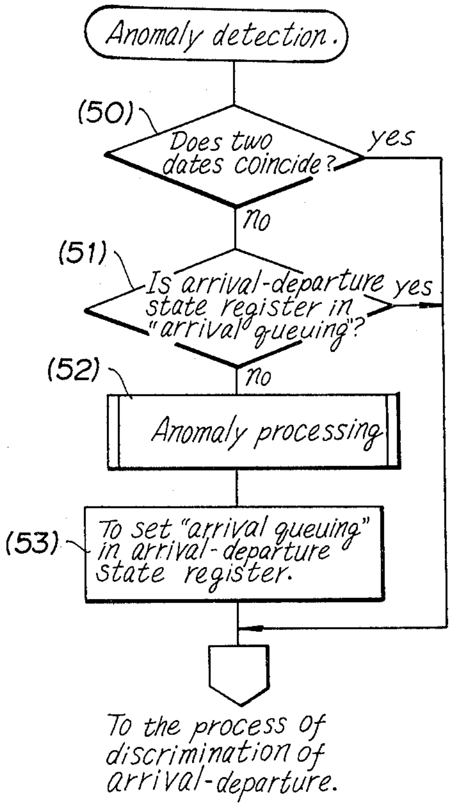
FIG. 10 is a flowchart of anomaly detection routine expressing another embodiment of the present invention.

That is, the routine (4) and (5) in the interruption processing of FIG. 8 may be omitted and, instead, the anomaly detection routine shown in FIG. 10 will be excuted at a stage prior to the process of discrimination of arrival-departure shown in FIG. 9. With respect to the anomaly detection routine shown in FIG. 10, the date data of arrival time area B1 in the personal file corresponding to the accepted time card 8 are checked at the first routine (50) to determine whether the date data coincide with the process date F1 in the process current data of relevant work class (FIG. 9). if the insertion of the time card 8 is the first insertion after the updating of process date F1, said both dates will not coincide with each other during routine (50) and a decision of NO is made. However, if the insertion is second or higher, the both dates will not coincide each other and an decision of YES is made. If the decision of YES is made in routine (50), the operation will jump to the process of discrimination of arrival-departure shown in FIG. 9. If a decision of NO is made in routine (50), the operation progresses to subsequent routine (51), and the arrival-departure state register E2 is checked to determined whether it is in the state of "arrival queuing". At the time of first insertion of card after updating the process date F1, the corresponding arrival-departure state register E2 should be in the state of "arrival queuing" if everything is normal. If the register E2 is not in the state of "arrival queuing", this will be considered to be an abnormal state that may occur when the owner of the time card forgot to insert it into the time recorder at the time of departure from work on the previous day. In case of normal state described previously, a decision of YES is made at the routine (51) and the operation will jump to the process of discrimination of arrival-departure of FIG. 9. But, if an abnormal state as described above is detected, the operation will move to the subsequent routine (52). The routine (52) is an anomaly process routine and performs such processing as preparation of work data of previous day in conformity with predetermined criteria. In subsequent routine (53), "arrival queuing" is set in said arrival-departure state register E2, and the process of discrimination of arrival-departure of FIG. 9 is started. Thus, as in the embodiment explained previously, even though a worker forgot to insert his time card at the time departure, an insertion of his time card at the time of arrival on the following day will be recognized as insertion at the time of arrival for his work, thus preventing occurrence of unnecessary disorder in the data processing.

Also, though the work class code is recorded by means of punched holes on each time card in the embodiments stated above and this code is read out by the time recorder to perform the processing for each work class, this invention is not limited only to such method. For instance, each person may feed his relevant work class code through the key input device 30.

Also, this invention can be applied not only to the equipment having the functions to process, sum and store the various kinds of work data as in the case of embodiments stated above, but also to other types of equipment which are able to transmit personal codes, time of acceptance of cards and other exception registration information to eternal computers different from time recorder for processing, summing and storing the work data in such computers, as well as to the simple time recorders which print only the time of arrival and departure.

As described above in detail, the time recorder of the present invention comprises read-out means for reading out the personal code recorded on the time card, the state storage means provided corresponding to each personal code for storing the state data expressing at least the distinction of either "arrival queuing" or "departure queuing", and the state storage control means and print column control means for making reference to said state storage means corresponding to the personal code read out by said read-out means at the time of receiving of time card, for printing the time of receiving on the arrival time column of time card when the contents of said storage means are "arrival queuing" and also for setting said state storage to "departure queuing", and also for printing the time of receiving in the departure time column and for setting said state storage means to "arrival queuing" when the contents of said state storage means are in the state of "departure queuing". Therefore, even though this time recorder is used where many workers are coming to work while other worker are going home within the same time zone, tnhis arrival-departure of each person can be correctly distinguished automatically and the time can be always printed correctly, thus eliminating troublesome manual operation for distinguishing the arrival-departure. Also, according to the second embodiment of the present invention, any troubles in printing and data processing except when an insertion of time card is forgotten at the time of departure can be reduced to a minimum.

As many apparently widely different embodiments of this invention may be made without departing from the spirit and scope thereof, it is to be understood that the invention is not limited to the specific embodiments thereof except as defined in the appended claims.

What we claim is:

1. A time recorder comprising:

an assembly for receving a time card having recorded thereon information identifying a specific individual and a number of lines in side-by-side columns on which arrival and departure times are to be printed, one of said columns recording arrival times and the other column departure times;

means for reading said information on said card and producing signals containing said information;

memory means for storing for each individual either an arrival queuing status or departure queuing status;

means for producing an output indicating the present time;

printing means movable along the direction of card width between first and second positions for printing the present time in one column in said first position and in the other column in said second position; and computer means for receiving said information signal and producing a signal to cause said printing means to move in accordance therewith and with the stored status and for changing the stored status.

2. A recorder as in claim 1 further including means for manually producing a signal indicating going out or coming in between arrival and departure so that a going out or coming in status is stored in said memory means in response thereto.

3. A recorder as in claim 2 wherein said memory means includes further means for storing for each individual daily and accumulative work data and wherein the going out and coming in data is stored in said further means.

4. A recorder as in claim 1 wherein said computer means periodically compares the present time with a stored value so as to change said status at predetermined times, if not previously changed.

5. A recorder as in claim 4 further including means for indicating the present time.

6. A recorder as in claim 5 wherein said computer means changes the status to arrival queuing if the day of insertion of a card is different from the day of the last previous insertion and the status is not that of arrival queuing.

7. A method of time clock recording comprising the steps of:

inserting into an assembly, which includes means for receiving a card, means for positioning that card for printing a given line and means for printing time information at a given line on which arrival and departure times are to be printed in one of two side-by-side columns, one of said columns recording arrival times and the other column departure times, a time card having information recorded thereon identifying a specific individual;

reading said card to produce signals containing said information;

storing in a computer memory for each individual either an arrival queuing status or departure queuing status;

operating a clock to produce an output indicating the present time;

moving said printing means along the direction of card width between first and second positions for printing in one of said columns in accordance with the stored status; and changing said status after said printing.

8. A method as in claim 7 further including the steps of manually producing a signal indicating going out or coming in between arrival and departure so that a going out or coming in status is stored.

9. A method as in claim 8 including the steps of storing for each individual daily and accumulative work data and storing the number of said goings out and comings in.

10. A method as in claim 7 including the steps of comparing the present time with a stored value and changing said status at predetermined times if not previously changed.

* * * * *